US012664215B2

(12) United States Patent
Riess et al.

(10) Patent No.: US 12,664,215 B2
(45) Date of Patent: Jun. 23, 2026

(54) COMPUTER-IMPLEMENTED DATA STRUCTURE, ELECTRONIC STORAGE MEDIUM, AND METHOD FOR DATA EXCHANGE

(71) Applicant: Robert Bosch GmbH, Stuttgart (DE)

(72) Inventors: Arnaud Riess, Vaihingen An der Enz (DE); Karsten Muehlmann, Stuttgart (DE); Martin Hintz, Grossbottwar (DE); Tilman Sinning, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/510,831

(22) Filed: Nov. 16, 2023

(65) Prior Publication Data

US 2024/0202242 A1      Jun. 20, 2024

(30) Foreign Application Priority Data

Dec. 16, 2022    (DE) ..................... 10 2022 213 776.0

(51) Int. Cl.
*G06F 5/06* (2006.01)
*G06F 16/901* (2019.01)

(52) U.S. Cl.
CPC ................................ *G06F 16/9024* (2019.01)

(58) Field of Classification Search
None
See application file for complete search history.

(56) References Cited

U.S. PATENT DOCUMENTS

| | | | | | |
|---|---|---|---|---|---|
| 9,990,138 | B2 * | 6/2018 | Halaharivi | ............ | G06F 3/0679 |
| 2002/0016900 | A1 * | 2/2002 | Miller | ..................... | G06F 9/544 |
| | | | | | 711/150 |
| 2005/0114609 | A1 * | 5/2005 | Shorb | ..................... | G06F 9/526 |
| | | | | | 711/152 |
| 2005/0268071 | A1 * | 12/2005 | Blandy | ............... | G06F 9/45558 |
| | | | | | 711/208 |
| 2024/0004733 | A1 * | 1/2024 | Hirsch | ..................... | G06F 9/546 |

OTHER PUBLICATIONS

Steven S. Skiena; Data Structures; Springer Nature Link; 2020; pp. 69-108.*

* cited by examiner

*Primary Examiner* — Ann J Lo
*Assistant Examiner* — Jermaine A Mincey
(74) *Attorney, Agent, or Firm* — NORTON ROSE FULBRIGHT US LLP

(57)      ABSTRACT

A computer-implemented data structure for a singly linked list for data exchange between a writing process and at least one reading process. The computer-implemented data structure including a first pointer data structure and a second pointer data structure, the first pointer data structure pointing to the oldest element in the list and the second pointer data structure pointing to the next writable element in the list, a third pointer data structure pointing to the next unread element in the list.

17 Claims, 5 Drawing Sheets

COMPUTER-IMPLEMENTED DATA STRUCTURE, ELECTRONIC STORAGE MEDIUM, AND METHOD FOR DATA EXCHANGE

CROSS REFERENCE

The present application claims the benefit under 35 U.S.C. § 119 of German Patent Application No. DE 10 2022 213 776.0 filed on Dec. 16, 2022, which is expressly incorporated herein by reference in its entirety.

FIELD

The present invention relates to a computer-implemented data structure for exchanging data between a writing process, also called a "sender" or "writer," and at least one reading process, also called a "receiver" or "reader." Furthermore, the present invention relates to a corresponding electronic storage medium and to a corresponding device.

BACKGROUND INFORMATION

The communication scheme "First-In, First-Out" or "FiFO" is known from computer science. A conversion of the scheme for communication between two concurrent processes, for example a writing process and one or more reading processes, can take place by means of a send list into which the writing process can continuously write new data, while the at least one reading process can continuously read out the oldest data. A singly linked list is suitable as a data structure for the send list.

SUMMARY

The present invention provides a computer-implemented data structure for a singly linked list for data exchange between a writing process (sender/writer) and at least one reading process (receiver/reader). According to an example embodiment of the present invention, the data structure includes a first pointer data structure and a second pointer data structure, the first pointer data structure pointing to the oldest element in the list and the second pointer data structure pointing to the next writable element in the list.

According to an example embodiment of the present invention, a a third pointer data structure is provided, the third pointer data structure pointing to the next unread element in the list.

In the present case, a singly linked list can be understood to mean a data structure in which the elements of the data structure comprise not only a data field for storing data but also a pointer data structure to the next element of the list. The pointer data structure of the last element of the list points to a so-called null element, also called a null pointer.

A pointer data structure, also called a "pointer," can in the present case be understood to mean a data structure that, instead of a datum, contains a reference to a (physical) storage region in which the datum is stored.

By means of the data structure according to the present invention, it is possible for the writing process to be able to safely remove elements from the data structure, also referred to as "to pop," while the reading process can read previously unread elements from the list.

Furthermore, without coming into conflict with the reading process, the writing process can remove any already read element from the data structure and not just the respectively last element.

According to one example embodiment of the present invention, the third pointer data structure always points to the element of the list to which the first or the second pointer data structure points, or points to an element between the first and second pointer data structure.

An element between the element to which the first pointer data structure points and the element to which the second data structure points is understood as an element which is passed when moving through a list, starting from the element to which the first pointer data structure points, to the element to which the second data structure points. In this case, moving through the list can take place in such a way that the next element in the list is considered to be the element to which the pointer data structure of the previous element points next.

According to one example embodiment of the present invention, the third pointer data structure can be modified exclusively by one of the at least one reading processes.

This can be achieved, for example, by the third pointer data structure being located in a storage region which is assigned exclusively to one of the at least one reading processes.

According to one example embodiment of the present invention, the first and second pointer data structures can be modified exclusively by the writing process.

This can be achieved, for example, by the first and second pointer data structures being located in a storage region which is assigned exclusively to the writing process.

According to one example embodiment of the present invention, the elements of the list can be modified exclusively by the writing process.

A further aspect of the present invention is an electronic storage medium on which the computer-implemented data structure according to the present invention is stored.

A further aspect of the present invention is a device comprising an electronic storage medium according to the present invention.

BRIEF DESCRIPTION OF THE DRAWINGS

Further features and advantages of aspects of the present invention are explained below on the basis of embodiments with reference to figures.

FIG. 2 shows a schematic representation of the insertion of a further datum into the data structure according to an example embodiment of the present invention.

FIG. 5 shows a schematic representation of the reading of an unread element of the data structure according to an example embodiment of the present invention.

DETAILED DESCRIPTION OF EXAMPLE EMBODIMENTS

Figure 1:
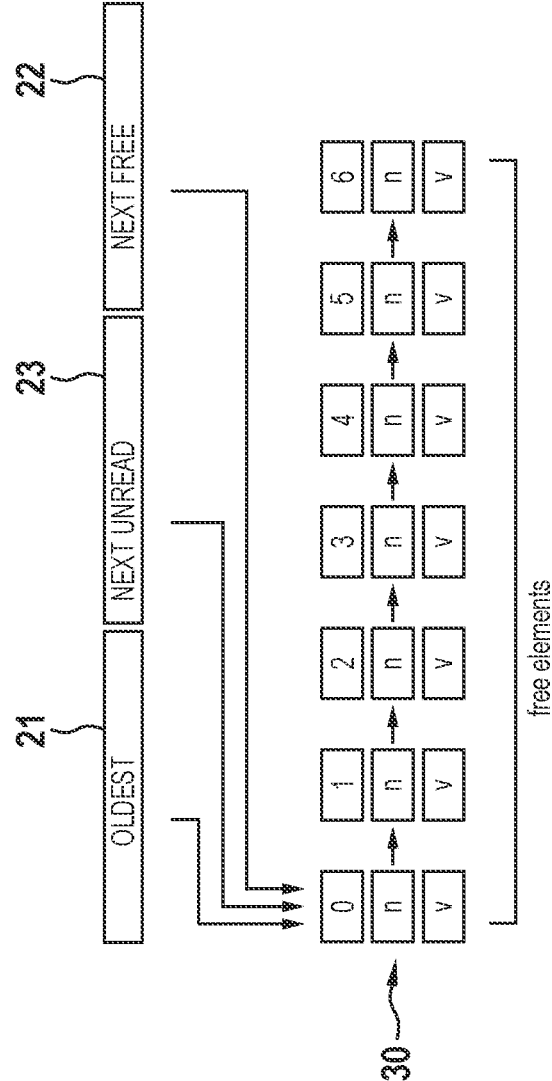
FIG. 1 shows a schematic representation of a data structure according to an example embodiment of the present invention.

FIG. 1 shows a schematic representation of a data structure according to the present invention. In the representation of FIG. 1, a first pointer data structure 21, a second pointer data structure 22, and a third pointer data structure 23 are shown.

Below the first pointer data structure 21, second pointer data structure 22, and third pointer data structure 23 is a schematic representation of a singly linked list 30.

Each element of the list 30 consists of: an index, here 0 to 6; a pointer data structure n, which points to the next element in the list 30, also called the "next pointer;" and a data field, here in each case with the value v. The value v stands for value and indicates that the data field of the element may have a content.

The first pointer data structure 21, also called the "oldest," is used to point to the oldest element in the list. The second pointer data structure 22, also called the "next free," is used to point to the next free element in the list. A free element is understood to mean an element into which a new datum can be written. This does not necessarily mean that the element is empty.

The third pointer data structure 23, also called the "next unread," is used to point to the next unread element in the list. Accordingly, to the element that can or is to be read next by the reading process.

The list is divided into two parts by the third pointer data structure 23. A first part comprising all already read elements of the list 30, and a second part comprising the not yet read elements of the list 30. The elements in the first part can be safely removed. In the present case, the term "remove" can be understood to mean that the (physical) storage space occupied thereby, i.e., allocated thereto, can be deallocated, or a new datum can be written into the data field of the element.

FIG. 1 shows a situation in which the first pointer data structure 21, the second pointer data structure 22, and the third pointer data structure 23 respectively point to the same element of the list 30, the first element in the case shown. Furthermore, all data fields of the elements have the entry v. This is a state of the data structure immediately after initialization.

The data structure is designed such that if the first pointer data structure 21 and the second pointer data structure 22 point to the same element in the list 30, the list is empty. Furthermore, if the second pointer data structure 22 and the third pointer data structure 23 point to the same element in the list 30, no unread element is present in the list 30. Furthermore, if the pointer data structure n of the element to which the second pointer data structure 22 points does not point to a valid destination, the list 30 is full.

According to one embodiment of the present invention, the third pointer data structure 23 always points to the element of the list 30 to which the first pointer data structure 21 or the second pointer data structure 23 points, or points to an element of the list 30 between the first pointer data structure 21 and the second pointer data structure 22.

According to one embodiment of the present invention, the third pointer data structure 23 can be modified exclusively by one of the at least one reading processes.

According to one embodiment of the present invention, the first pointer data structure 21 and the second pointer data structure 22 can be modified exclusively by the writing process.

Figure 2:
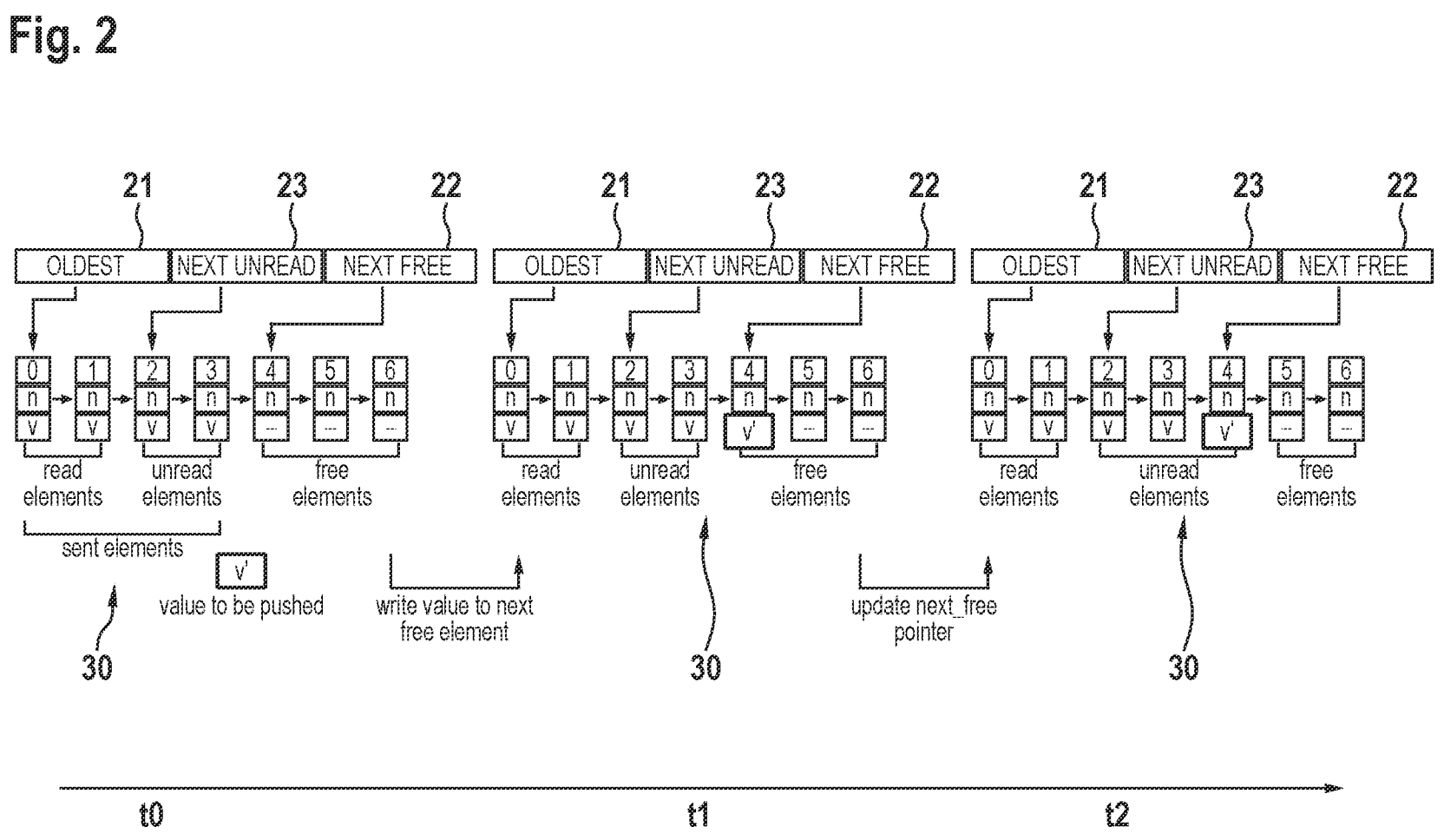

On the basis of schematic representations of the data structure according to the present invention, FIG. 2 shows the process of inserting a further datum into the list 30, also called a "push."

At time t0, the first pointer data structure 21 points to element 0 of the list 30, the second data structure 22 points to element 4 of the list 30, and the third pointer data structure 23 points to element 4 of the list. This means that the list 30 starts at element 0 with the oldest element. The next free element is located at element 4. The next unread element is element 2. Accordingly, the elements 0 and 1 have already been read by one of the at least one reading processes. The elements 2 and 3 are still unread.

If the list 30 is not full, a further datum v' is now to be entered into the list. In the situation shown, the list 30 is not full since the pointer data element n of the element 4, to which the second data structure 22 points, points to element 5 of the list 30 and thus not to an invalid destination.

At time t1, the further datum v' is written into the data field of the element 4 of the list 30.

At time t2, the second pointer data structure is modified in such a way that it points to the element 5 of the list 30.

The process of inserting a further datum into the list 30 is thus concluded.

Figure 3:
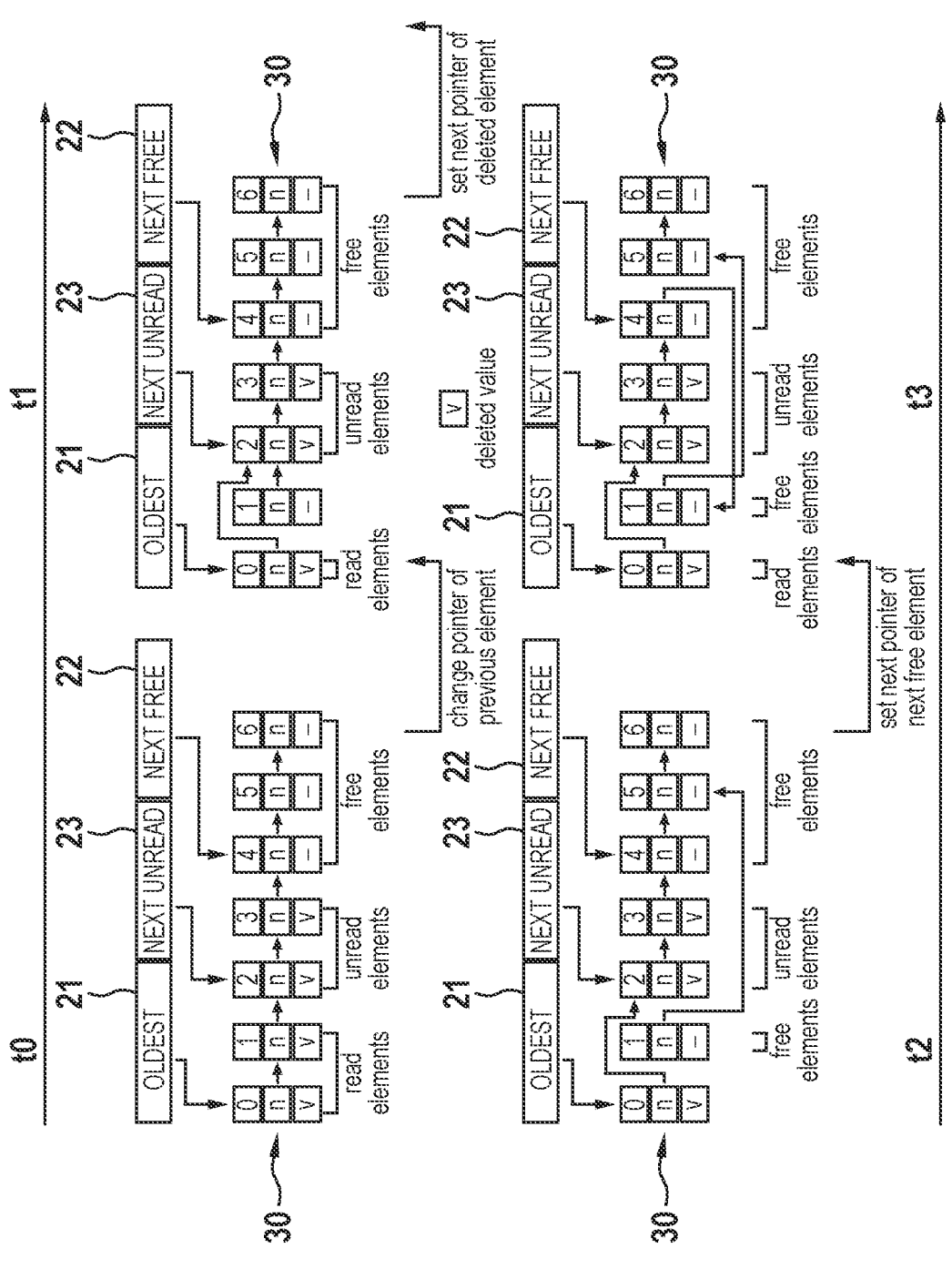
FIG. 3 shows a schematic representation of the removal of an element from the data structure according to an example embodiment of the present invention.

On the basis of schematic representations of the data structure according to the present invention, FIG. 3 shows the process of removing an element from the list 30, also called a "pop."

An element can only be removed from the list 30 of the data structure of the present invention if the element is an already read element. This means that the element is an element in the list 30 before the element to which the third data structure 23 points, if an element is located there.

In the situation shown, the element 1 can, for example, be removed at time t0.

At time t1, the pointer data structure n of the preceding element, here of the element 0, is modified in such a way that it points to the element of the pointer data structure n of the element to be removed. The element 1 is thus removed from the list 30. The (physical) storage space assigned to the element could now be deallocated.

In order to supply the element to the list again, the following steps are carried out at times t2 and t3.

At time t2, the removed element is added to the region of the free elements of the list 30. For this purpose, the pointer element n of the removed element is modified in such a way that it points to the destination of the pointer element n of the element to which the second pointer data element 22 points.

At time t3, the pointer element n of the element to which the second pointer data structure 22 points is modified in such a way that it points to the removed element. Thereafter, the removed element 1 is located in the region of the unread elements of the list 30. On the basis of the shown element indices, the order is then: 0, 2, 3, 4, 1, 5, 6.

Figure 4:
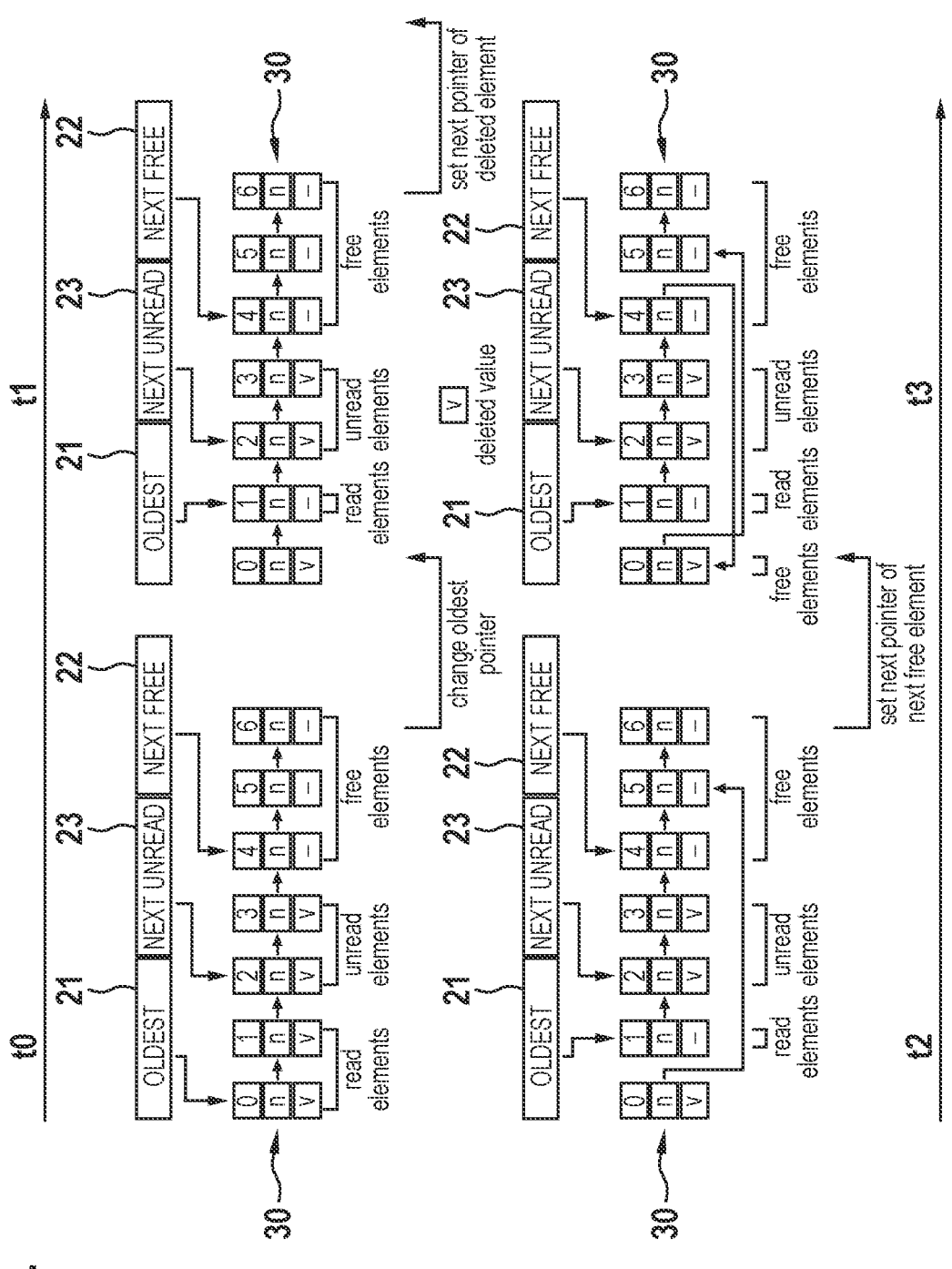
FIG. 4 shows a schematic representation of the removal of the oldest element from the data structure according to an example embodiment of the present invention.

On the basis of schematic representations of the data structure according to the present invention, FIG. 4 shows the process of removing the oldest element from the list 30.

In principle, the element to which the first data structure points can also be added to the region of the unread elements of the list 30. For this purpose, instead of the pointer element n of the preceding element, the first pointer data structure 21 is to be adapted accordingly at time 1. The adaptations at times t2 and t3 take place analogously.

Figure 5:
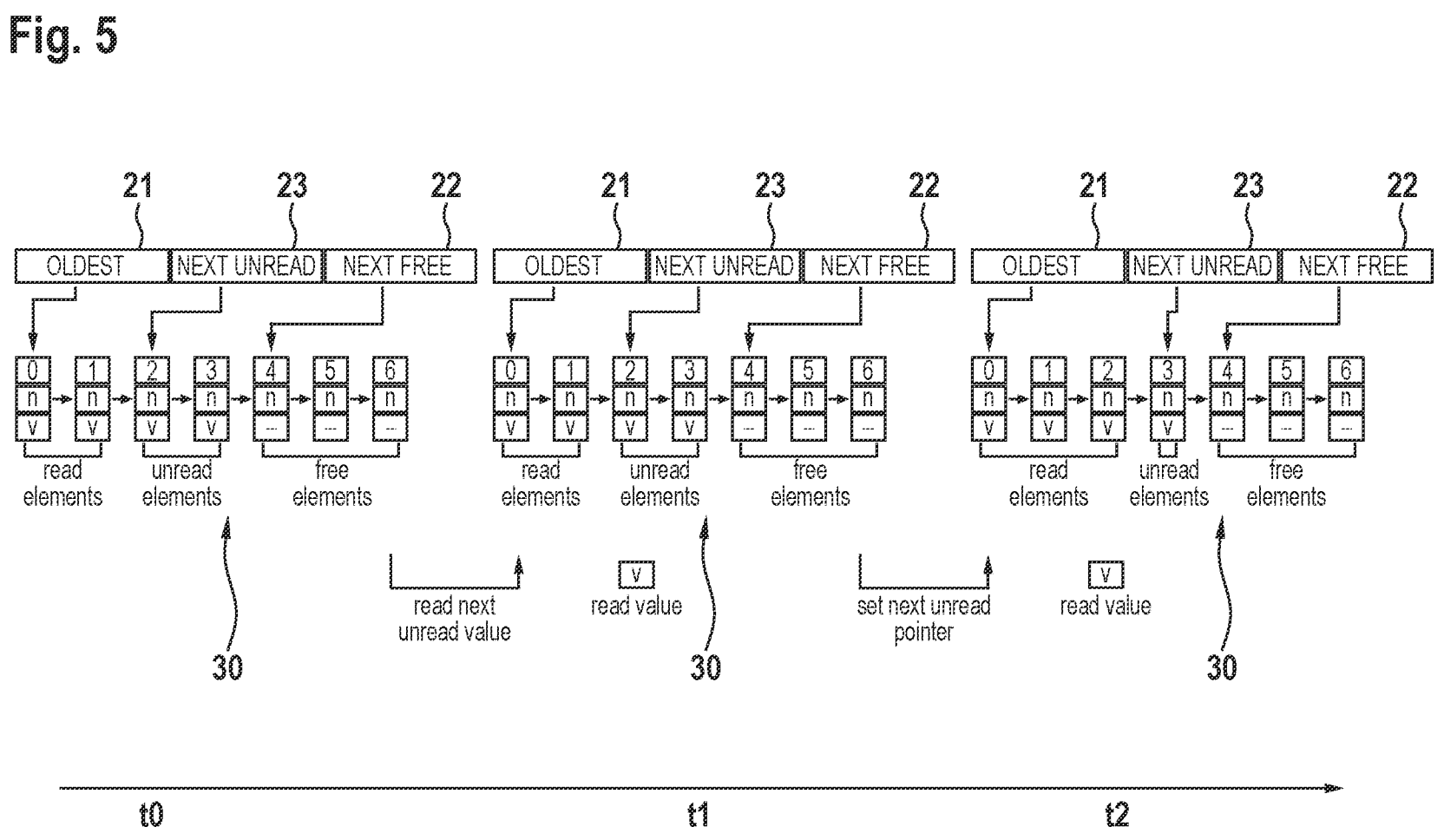

On the basis of schematic representations of the data structure according to the present invention, FIG. 5 shows the process of reading an unread element from the list 30.

It is only possible to read from the list 30 if at least one unread element is located in the list 30. This is the case if the second pointer data structure 22 and the third pointer data structure 23 do not point to the same element of the list 30.

The data field of an element of the list 30 is read by the at least one reading process or receiver, also called the "reader," without changing the content of the data fields of the list 30 of the data structure of the present invention.

In order to avoid data inconsistencies by so-called race conditions, only the data fields of the still unread elements of the list 30 can be read.

In the situation shown, the elements 2 and 3 of the list 30 are still unread at time t0. The third pointer data structure 30 points to the element to be read next. At time t0, this is element 2.

At time t1, the data field of the element 2 is read out by the reading process.

At time t2, the third pointer data structure 23 is modified in such a way that it points to the element to which the pointer data structure n of the element that has just been read has pointed, here element 3. Thereafter, the element 2 that has just been read belongs to the read elements since it is located in the list 30 before the element to which the third data structure 23 points. And the element 3 is the unread element of the list 30 to be read next.

What is claimed is:

1. A computer-implemented data structure for a singly linked list for data exchange between a writing process and at least one reading process, comprising:
   a first pointer data structure, wherein the list includes a plurality of singly linked elements, each of the elements in the list including: (i) an index, (ii) a pointer data structure that points to a next element in the list, and (iii) a data field for storing data for the data exchange between the writing process and the at least one reading process, and wherein the first pointer data structure points to an oldest element in the list;
   a second pointer data structure, the second pointer data structure pointing to a next writable element in the list, which is a next free element in the list; and
   a third pointer data structure, the third pointer data structure pointing to a next unread element in the list;
   wherein the first point data structure, the second point data structure, and the third point data structure are separate data structures relative to one another;
   wherein the singly linked list is divided into two parts by the third pointer data structure, including a first part of already read elements of the list, and a second part of not yet read elements of the list, and wherein the already read elements of the list in the first part are safely removable from occupied storage space.

2. The computer-implemented data structure according to claim 1, wherein the third pointer data structure always points to an element of the list to which the first pointer data structure or the second pointer data structure points, or points to an element between the element to which the first pointer data structure points and the element to which the second pointer data structure points.

3. The computer-implemented data structure according to claim 1, wherein the third pointer data structure can be modified exclusively by one of the at least one reading processes, and wherein the third pointer data structure is located in a storage region which is assigned exclusively to one of the at least one reading processes.

4. The computer-implemented data structure according to claim 1, wherein the first pointer data structure and the second pointer data structure can be modified exclusively by the writing process, and wherein the first and second pointer data structures can be modified exclusively by the writing process.

5. The computer-implemented data structure according to claim 1, wherein the singly linked elements of the list can be modified exclusively by the writing process.

6. A non-transitory storage medium, on which is stored a computer-implemented data structure, which is executable by a processor, comprising:
   a program code arrangement having program code for a singly linked list for data exchange between a writing process and at least one reading process;
   wherein the computer-implemented data structure includes:
   a first pointer data structure, wherein the list includes a plurality of singly linked elements, each of the elements in the list including: (i) an index, (ii) a pointer data structure that points to a next element in the list, and (iii) a data field for storing data for the data exchange between the writing process and the at least one reading process, and wherein the first pointer data structure points to an oldest element in the list;
   a second pointer data structure, the second pointer data structure pointing to a next writable element in the list, which is a next free element in the list; and
   a third pointer data structure, the third pointer data structure pointing to a next unread element in the list;
   wherein the first point data structure, the second point data structure, and the third point data structure are separate data structures relative to one another;
   wherein the singly linked list is divided into two parts by the third pointer data structure, including a first part of already read elements of the list, and a second part of not yet read elements of the list, and wherein the already read elements in the first part are safely removable from occupied storage space.

7. A device, comprising:
   a non-transitory storage medium, on which is stored a computer-implemented data structure, which is executable by a processor, comprising:
   a program code arrangement having program code for providing a singly linked list for data exchange between a writing process and at least one reading process;
   wherein the computer-implemented data structure includes:
   a first pointer data structure, wherein the list includes a plurality of singly linked elements, each of the elements in the list including: (i) an index, (ii) a pointer data structure that points to a next element in the list, and (iii) a data field for storing data for the data exchange between the writing process and the at least one reading process, and wherein the first pointer data structure points to an oldest element in the list;
   a second pointer data structure, the second pointer data structure pointing to a next writable element in the list, which is a next free element in the list; and
   a third pointer data structure, the third pointer data structure pointing to a next unread element in the list;
   wherein the first point data structure, the second point data structure, and the third point data structure are separate data structures relative to one another;
   wherein the singly linked list is divided into two parts by the third pointer data structure, including a first part of already read elements of the list, and a second part of not yet read elements of the list, and wherein the already read elements in the first part are safely removable from occupied storage space.

8. The computer-implemented data structure according to claim 1, wherein the third pointer data structure can be modified exclusively by one of the at least one reading processes, and wherein the third pointer data structure is located in a storage region assigned exclusively to one of the at least one reading processes.

9. The computer-implemented data structure according to claim 1, wherein the first pointer data structure and the second pointer data structure can be modified exclusively by the writing process, and wherein the first pointer data structure and the second pointer data structure are located in a storage region assigned exclusively to the writing process.

10. The computer-implemented data structure according to claim 1, wherein when the first pointer data structure points and the second pointer data structure point to the same element in the list, the list is empty.

11. The computer-implemented data structure according to claim 1, wherein when the second pointer data structure and the third point data structure point to the same element in the list, no unread element is present in the list.

12. The computer-implemented data structure according to claim 1, wherein an element of the list can be removed from the list when the element is an already read element, and wherein when the element of the list is removed, storage space assigned to the element is deallocated.

13. The computer-implemented data structure according to claim 1, further comprising the singly linked list.

14. The non-transitory storage medium, wherein the computer-implemented data structure further includes the singly linked list.

15. The device according to claim 7, wherein the computer-implemented data structure further includes the singly linked list.

16. The computer-implemented data structure according to claim 13, wherein the singly linked elements of the list can be modified exclusively by the writing process.

17. The computer-implemented data structure according to claim 16, wherein the singly linked list is a separate data structure relative to first pointer structure, the second pointer structure, and the third pointer structure.

* * * * *